United States Patent

[11] 3,601,426

| | | |
|---|---|---|
| [72] | Inventor | Jacques Hury<br>Rueil-Malmaison, France |
| [21] | Appl. No. | 872,998 |
| [22] | Filed | Oct. 31, 1969 |
| [45] | Patented | Aug. 24, 1971 |
| [73] | Assignees | Automobile Peugeot<br>Paris, France;<br>Regie Nationale des Usines Renault<br>Billancourt, France |
| [32] | Priority | Nov. 13, 1968 |
| [33] | | France |
| [31] | | 173,441 |

[54] VEHICLE REAR ASSEMBLY
15 Claims, 4 Drawing Figs.

[52] U.S. Cl.................................................. 280/124,
267/15
[51] Int. Cl..................................................... B60g 11/32

[50] Field of Search........................................ 280/124;
267/15, 20

[56] References Cited
UNITED STATES PATENTS

| 2,823,927 | 2/1958 | Goby................................ | 267/20 (X) |
| 2,988,374 | 6/1961 | Boyles............................. | 280/124 |
| 3,473,821 | 10/1969 | Barenyi et al.................... | 280/124 |

Primary Examiner—Milton Buchler
Assistant Examiner—C. A. Rutledge
Attorney—Burns, Doane, Swecker & Mathis ABSTRACT: Rear assembly for motor vehicle, of the type comprising independent wheels and trailing suspension arms, wherein each suspension arm has fixed thereto a shaft member extending transversely with respect to the longitudinal axis of the vehicle, said shaft members being connected at their outer ends to the suspended part of the vehicle and being interconnected at their inner ends.

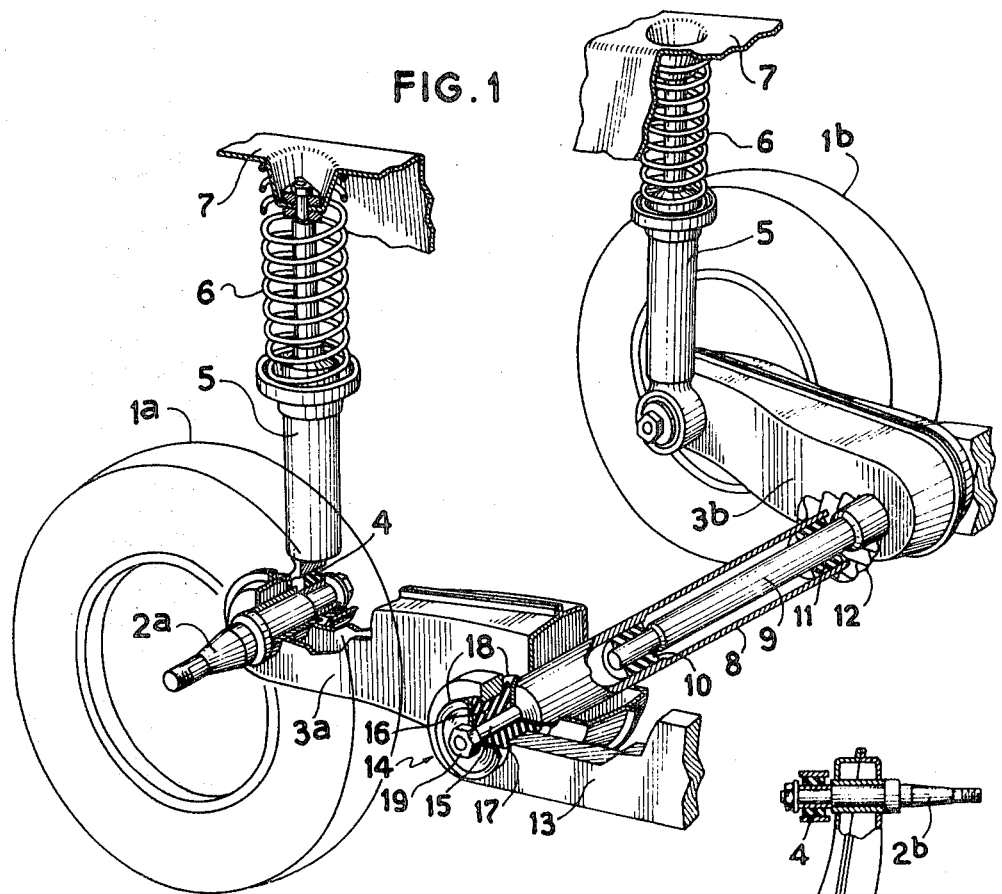
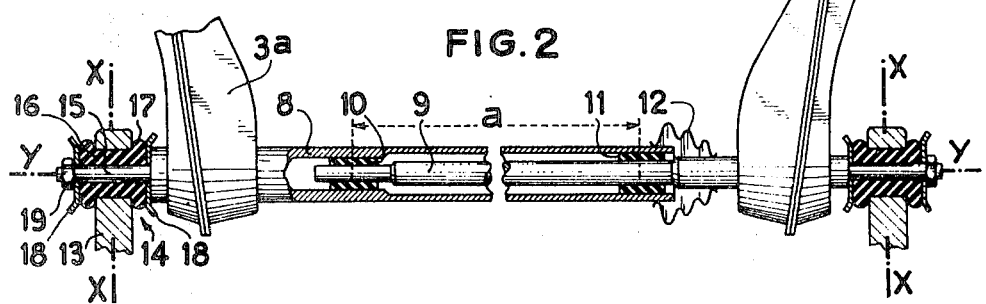
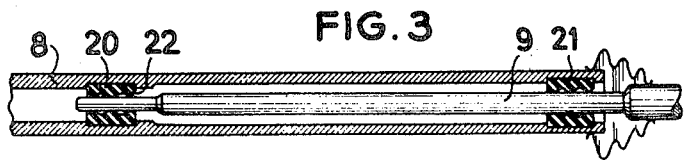
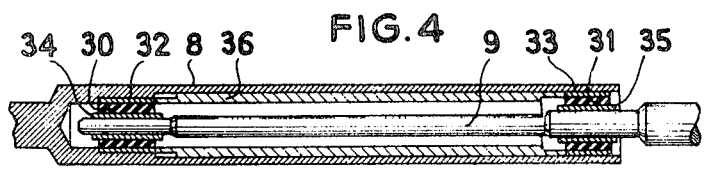

VEHICLE REAR ASSEMBLY

The present invention relates to a rear assembly for automotive vehicles with independent wheels and trailing arms.

In devices of this type, each rear wheel is mounted on a journal which is fixed to the end of a suspension arm which must be fixed to the body or chassis by means of mountings permitting oscillation about an axis essentially transversal with respect to the longitudinal axis of the vehicle, as well as great flexibility in the longitudinal direction, whilst rendering impossible any undesirable deflection or swiveling of the wheels. These conditions are usually achieved:

either by fixing each arm to the body by two flexible joints sufficiently apart from one another, the first placed on a side-member, the second fixed towards the center of the floor, but this solution makes it necessary to reinforce the latter;

or by linking the two suspension arms to a rigid common crossmember which is itself flexibly mounted at its ends to the vehicle body.

One object of the invention is to satisfy the above stated conditions without it being necessary to reinforce the floor or to use the crossbeam. It provides a rear assembly for an automotive vehicle with independent wheels and trailing suspension arms, each wheel being mounted on a journal fixed to a suspension arm, wherein each suspension arm is integral with or fixed to a shaft member extending essentially transversely with respect to the longitudinal axis of the vehicle, said two shaft members being substantially coaxial and being respectively connected at their outer ends to the suspended part of the vehicle and being supported one by the other at their respective inner ends.

The invention will be hereinafter described, with reference to the accompanying drawing wherein:

FIG. 1 is a perspective view, partly in section, of a rear assembly according to the invention;

FIG. 2 is a top plan view, partly in section, of the rear assembly according to FIG. 1;

FIGS. 3 and 4 are sectional views showing two modifications of the joint between the two shaft members of the assembly.

In a vehicle rear assembly, such as shown in FIG. 1, each rear wheel $1^a$ and $1^b$ is mounted on a journal $2^a$ and $2^b$, rigidly fixed to the end of a suspension arm $3^a$, $3^b$ respectively. One each journal is also fixed, as usual, the lower part 4 of a spring and shock absorber device comprising, for example, an hydraulic shock absorber 5 and a coaxial coil spring 6, the upper part of this device being rigidly connected to the body 7 which constitutes the suspended part of the vehicle.

According to the invention, the arm $3^a$ of wheel $1^a$ is rigidly connected to a shaft member 8, extending transversely with respect to the longitudinal axis of the vehicle, and having a general tubular shape in the embodiment shown. A shaft member 9, coaxial with shaft member 8, is rigidly connected to arm $3^b$ of the other wheel $1^b$. The two shaft members 8 and 9 are fitted one within the other and supported one by the other by means of two joints 10 and 11, consisting, for example, of bearing bushings made of a suitable antifriction material. The distance between joints 10 and 11 is given by reference $a$ (FIG. 2).

A bellows 12 in rubber, plastic or any other suitable material, connects the end of tube 8 with shaft 9 in order to prevent foreign matter from reaching joint 11.

At their outer ends located out of arms $3^a$, $3^b$, the shaft members 8 and 9 are fastened to the suspended part of the vehicle, in this case side-members 13, by means of elastic joints 14, shaft members 8, 9 and joints 10, 11, 14 having a common axis Y–Y.

For each of the joints 14, the center member 15, consisting of the end of shaft member 8 and 9 respectively, is held in an elastic collar 16 defining two shoulders 17, held between cup-chaped elements 18 and side-member 13 by a nut 19. This type of joint 14, which is known in the art, provides a greater flexibility of displacement in the direction X–X than in the direction Y–Y, direction X–X being parallel to the longitudinal axis of the vehicle.

The operation of the rear assembly as above described is the following:

Each wheel $1^a$ and $1^b$ can shift in the vertical direction independently from the other wheel, due to the oscillation of suspension arms $3^a$ and $3^b$ and of corresponding shaft members 8 and 9 about axis Y–Y.

The purpose of joints 10 and 11 is to permit a relative oscillatory or rotational movement between shaft members 8 and 9, although maintaining their axes substantially aligned. Distance $a$ between these joints should be such that the radial forces which they withstand be acceptable for the material used. The longitudinal forces parallel to direction X–X, due to unevenness of the road, are absorbed by the displacement of the outer ends of the shaft members 8 and 9 with respect to the vehicle body, due to the flexibility of joints 14 which in turn gives good filtering-out of noise and vibration.

However, this displacement in direction X–X only brings about in infinitely small displacement of the common axis Y–Y of shaft members 8 and 9 and a pivoting of the wheels which is also negligible by reason of the large distance between the two joints 14. The wheels, therefore, always stay correctly aligned.

If can likewise be stated that the transverse displacement of the wheels is practically negligible due to the stiffness of the joints 14 in direction Y–X.

FIG. 3 shows a modification according to which joints 20 and 21 are bushings in an elastomeric material such as polyurethane, located in housings 22 of tubular member 8, and having internal circular grooves in order to reduce rubbing on shaft 9. It will, however, be understood that any other type of joint which does not produce a torque reaction between members 8 and 9 can also be used. In particular, joints equivalent to joints 10, 11 and 20, 21 could be ball or needle bearings.

FIG. 4 shows another modification according to which joints 10 and 11 are replaced by elastic joints, comprising bushings 30, 31, made of elastomer, bonded to two metallic sleeves. The outer sleeve 32, 33, respectively, is mounted as a press fit in the female shift 8, and the inner sleeve, 34, 35, respectively, is mounted as a press fit on the male shaft 9.

In this case, it is necessary to provide a spacer element 36 between the outer sleeves 32 and 33 in order to allow of the assembly of joint 30 which is remote from the end of tubular shaft 8. On the other hand, bellows 12 as provided in the other embodiments become unnecessary.

The last embodiment described with reference to FIG. 4, has the advantage of providing a torque reaction between parts 8 and 9, caused by bushings 30 and 31 during opposite shifting of the wheels, which produces an anti-inclination or antiroll correction.

Another embodiment of the invention can be provided, according to which the two half rear assemblies are identical, each carrying a male of female shaft member, the two shaft members being supported one by the other by means of a suitable coupling. This type of coupling could be, for example, tubular if the two shift members are male, or solid, if the two shaft members are tubular.

Having now described my invention what I claim as new and desire to secure by Letters Patent is:

1. A rear assembly for an automotive vehicle, having independent wheels and trailing suspension arms each wheel being mounted on a journal fixed to a suspension arm, wherein each suspension arm is integral with or fixed to a shaft member extending essentially transversely with respect to the longitudinal axis of the vehicle, said shaft members being substantially coaxial, and being respectively connected at their outer ends located out of said suspension arms to the suspended part of the vehicle and being supported one by the other at their respective inner ends, means being provided between said shift members for allowing a relative angular movement of said shafts about their common axis.

2. A rear assembly as claimed in claim 1, comprising spring return means provided between the two shaft members, said spring return means being adapted to exert a reaction torque between the two shaft members when said shaft members undergo a relative rotation movement about their common axis.

3. A rear assembly as claimed in claim 2, wherein said spring return means comprises two bushings of elastomer, each bonded to two rigid sleeves fitted respectively to the two shaft members, a tubular spacer element being provided between the two outer sleeves.

4. A rear assembly as claimed in claim 1, wherein one of said shaft members is tubular and surrounds the other of said shafts over an overlapping area, bearing means being provided between the shaft members, respectively adjacent the ends of said overlapping area.

5. A rear assembly as claimed in claim 4, wherein said bearing means comprises bushings made of antifriction material.

6. A rear assembly as claimed in claim 4, wherein said bearing means comprises ball or needle bearings.

7. A rear assembly as claimed in claim 1, wherein the outer end of each shaft member is connected to the suspended part of the vehicle by an elastic joint having a greater stiffness in the transverse direction of the vehicle than in the longitudinal direction of the vehicle.

8. A rear assembly as claimed in claim 1, wherein one of said shaft members is tubular and surrounds the other of said shaft members over an overlapping area, a radial clearance being defined between said shaft members and bearing means being provided therebetween respectively adjacent the ends of said overlapping area.

9. A rear assembly for an automotive vehicle, having independent wheels and trailing suspension arms, each wheel being mounted on a journal fixed to a suspension arm, wherein each suspension arm is integral with or fixed to a shaft member extending essentially transversely with respect to the longitudinal axis of the vehicle, said shaft members being substantially coaxial, and being respectively connected at their outer ends located out of said suspension arms to the suspended part of the vehicle and being supported one by the other at their respective inner ends, means being provided between said shift members for allowing a relative angular movement of paid shafts about their common axis.

10. A vehicle as claimed in claim 9, comprising spring return means provided between the two shaft members, said spring return means being adapted to exert a reaction torque between the two shaft members when said shaft members undergo a relative rotation movement about their common axis.

11. A vehicle as claimed in claim 10, wherein said spring return means comprises two bushings of elastomer, each bonded to two rigid sleeves fitted respectively to the two shaft members, a tubular spacer element being provided between the two outer sleeves.

12. A vehicle as claimed in claim 11, wherein one of said shaft members is tubular and surrounds the other of said shafts over an overlapping area, bearing means being provided between the shaft members, respectively adjacent the ends of said overlapping area.

13. A vehicle as claimed in claim 12, wherein said bearing means comprises bushings made of antifriction material.

14. A vehicle as claimed in claim 13, wherein said bearing means comprises ball or needle bearings.

15. A vehicle as claimed in claim 14, wherein the outer end of each shaft member is connected to the suspended part of the vehicle by an elastic joint having a greater stiffness in the transverse direction of the vehicle than in the longitudinal direction of the vehicle.